US 7,753,150 B2

(12) United States Patent
Tamor

(10) Patent No.: US 7,753,150 B2
(45) Date of Patent: Jul. 13, 2010

(54) CONTROL SYSTEM FOR A HYBRID ELECTRIC VEHICLE TO ANTICIPATE THE NEED FOR A MODE CHANGE

(75) Inventor: Michael A. Tamor, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 12/125,101

(22) Filed: May 22, 2008

(65) Prior Publication Data

US 2008/0224478 A1 Sep. 18, 2008

Related U.S. Application Data

(60) Division of application No. 10/908,598, filed on May 18, 2005, now Pat. No. 7,407,026, which is a continuation-in-part of application No. 10/230,707, filed on Aug. 29, 2002, now Pat. No. 7,021,409, which is a continuation-in-part of application No. 09/686,472, filed on Oct. 11, 2000, now abandoned.

(51) Int. Cl.
*B60W 10/04* (2006.01)

(52) U.S. Cl. .............................. 180/65.265; 180/65.28; 180/65.285; 903/903; 903/947; 701/22

(58) Field of Classification Search .............. 180/65.21, 180/65.265, 65.27, 65.275, 65.28, 65.285, 180/65.29; 903/930, 947; 701/22
See application file for complete search history.

(56) References Cited

U.S. PATENT DOCUMENTS

| | | | |
|---|---|---|---|
| 5,285,111 A | | 2/1994 | Sherman |
| 5,343,970 A | * | 9/1994 | Severinsky ............... 180/65.25 |
| 5,635,805 A | | 6/1997 | Ibaraki et al. |
| 5,697,466 A | | 12/1997 | Moroto et al. |
| 5,713,814 A | | 2/1998 | Hara et al. |
| 5,820,172 A | | 10/1998 | Brigham et al. |

(Continued)

FOREIGN PATENT DOCUMENTS

DE 44222636 1/1996

(Continued)

OTHER PUBLICATIONS

Dan Colvin et al., SAE Technical Paper Series, 2004-01-0063, "Challenges of Engine Starts and Drivability in a Parallel Hybrid-Electric System", Mar. 8-11, 2004, pp. 1-12.

*Primary Examiner*—Lesley Morris
*Assistant Examiner*—John D Walters
(74) *Attorney, Agent, or Firm*—David B. Kelley; Brooks Kushman P.C.

(57) ABSTRACT

A parallel hybrid electric vehicle method and system including an internal combustion engine (ICE), an electric traction motor/generator, and a controller. A control strategy is provided to prevent unpredicted or undesired engine starts by anticipating the need for the vehicle engine, while avoiding "false starting" the engine or allowing an annoying lag in performance that will occur if the engine is not started in advance of an actual requirement. The invention anticipates the need for engine starts and electromotive driving by monitoring vehicle speed and driver commands and their rates of change. The invention allows consistent performance and establishes seamless transitions between engine driving and electromotive driving.

19 Claims, 8 Drawing Sheets

U.S. PATENT DOCUMENTS

| | | | |
|---|---|---|---|
| 5,841,201 A * | 11/1998 | Tabata et al. | 290/40 C |
| 5,842,534 A | 12/1998 | Frank | |
| 5,865,263 A | 2/1999 | Yamaguchi et al. | |
| 5,898,282 A | 4/1999 | Drozdz et al. | |
| 5,935,040 A | 8/1999 | Tabata et al. | |
| 5,939,794 A | 8/1999 | Sakai et al. | |
| 6,003,626 A * | 12/1999 | Ibaraki et al. | 180/65.25 |
| 6,019,183 A | 2/2000 | Shimasaki et al. | |
| 6,026,921 A | 2/2000 | Aoyama et al. | |
| 6,059,064 A | 5/2000 | Nagano et al. | |
| 6,064,161 A | 5/2000 | Takahara et al. | |
| 6,090,007 A | 7/2000 | Nakajima et al. | |
| 6,098,733 A | 8/2000 | Ibaraki et al. | |
| 6,102,144 A | 8/2000 | Lutz | |
| 6,116,363 A | 9/2000 | Frank | |
| 6,164,400 A | 12/2000 | Jankovic et al. | |
| 6,176,808 B1 | 1/2001 | Brown et al. | |
| 6,201,312 B1 | 3/2001 | Shioiri et al. | |
| 6,217,479 B1 | 4/2001 | Brown et al. | |
| 6,231,479 B1 | 5/2001 | Kraska et al. | |
| 6,242,873 B1 | 6/2001 | Drozdz et al. | |
| 6,253,140 B1 | 6/2001 | Jain et al. | |
| 6,278,926 B1 | 8/2001 | Jain et al. | |
| 6,316,904 B1 | 11/2001 | Semenov et al. | |
| 6,364,807 B1 | 4/2002 | Koneda et al. | |
| 6,370,463 B1 | 4/2002 | Fujii et al. | |
| 6,385,520 B1 | 5/2002 | Jain et al. | |
| 6,393,350 B1 | 5/2002 | Light et al. | |
| 6,679,214 B2 * | 1/2004 | Kobayashi et al. | 123/179.4 |
| 2006/0074530 A1 | 4/2006 | Meyers et al. | |

FOREIGN PATENT DOCUMENTS

| | | |
|---|---|---|
| EP | 0699554 | 3/1996 |
| EP | 0769402 | 4/1997 |
| EP | 0812717 | 12/1997 |
| EP | 1072460 | 1/2001 |
| EP | 1136311 | 9/2001 |
| JP | 2000219062 | 8/2000 |

* cited by examiner

CONTROL SYSTEM FOR A HYBRID ELECTRIC VEHICLE TO ANTICIPATE THE NEED FOR A MODE CHANGE

CROSS-REFERENCE TO RELATED APPLICATIONS

This application is a division of U.S. application Ser. No. 10/908,598, filed May 18, 2005, which is a continuation-in-part of U.S. application Ser. No. 10/230,707, filed Aug. 29, 2002, now U.S. Pat. No. 7,021,409, which is a continuation-in-part of Ser. No. 09/686,472, filed Oct. 11, 2000, now abandoned. Applicant claims the benefit of the priority of those applications.

BACKGROUND OF THE INVENTION

1. Field of the Invention

The present invention relates generally to hybrid electric vehicles (HEVs), and specifically to a method and system to improve the efficiency and drivability of a HEV by monitoring vehicle control variables and their rate of change, whereby driver demand is anticipated so that unpredicted or undesired engine false starts and performance lags are prevented.

2. Background Art

The need to reduce fossil fuel consumption and undesirable engine exhaust gas emissions from vehicles powered by an internal combustion engine (ICE) is well known. Vehicles powered by battery-powered electric traction motors have attempted to address this need. However, electric vehicles have limited operating range and limited power capabilities. They also require substantial time to recharge their batteries. An alternative solution is to combine an ICE and an electric traction motor in one vehicle. Such vehicles are typically called hybrid electric vehicles (HEVs). See generally, U.S. Pat. No. 5,343,970 (Severinsky). HEVs reduce both undesirable exhaust gas emissions and fuel consumption because a smaller engine can be used. Under certain conditions, the engine can be turned off.

The HEV has been described in a variety of configurations. Many known HEV designs use systems in which an operator is required to select between electric and internal combustion engine operation. In other configurations, the electric motor drives one set of wheels, and the ICE drives a different set of wheels.

Other, more useful, configurations include, for example, a series hybrid electric vehicle (SHEV), which is a vehicle with an engine (most typically an ICE) that powers a generator. The generator, in turn, provides electric power for a battery and an electric traction motor coupled to the drive wheels of the vehicle. No mechanical connection exists between the engine and the drive wheels. Another useful configuration is a parallel hybrid electrical vehicle (PHEV), which is a vehicle with an engine (most typically an ICE), battery, and electric traction motor that combine to provide torque to the drive wheels of the vehicle.

A parallel/series hybrid electric vehicle (PSHEV) has characteristics of both the PHEV and the SHEV. The PSHEV is also known as a torque (or power) split powertrain configuration. In the PSHEV, the engine torque can be used to power a motor/generator and/or contribute to the necessary traction wheel or output shaft torque. The motor/generator generates electrical power for the battery, or it can act as a traction motor to contribute to the necessary wheel or output shaft torque. The traction motor/generator can be used also to recover braking energy to the battery if a regenerative braking system is used.

The desirability of combining the ICE with an electric motor/generator is clear. Fuel consumption and undesirable engine exhaust gas emissions are reduced with no appreciable loss of performance or range of the vehicle. Nevertheless, there remains substantial room for development of ways to optimize HEV operation. This includes the need to ensure that vehicle drivability is consistent, predictable and pleasing to the customer while also maintaining efficiency.

Factors involved in achieving an acceptable level of HEV drivability are the frequency and character of engine-start and engine-stop events. Frequent engine starts and stops can be annoying, especially if they do not occur in response to any conscious input from the vehicle driver.

Some engine starts and stops are dictated by an energy management strategy (EMS) that seeks to combine the engine and motor drives to achieve maximum fuel economy. For example, the EMS might start the engine whenever demand exceeds a predetermined motive power threshold. Also, the engine must start when driver demand for power is in excess of that available from the electric system.

Frequent, annoying, high-emission, and engine-wearing "false starts" can occur when the engine is started in response to what later proves to be a very brief demand for power in excess of the motive power threshold but still within the drive capabilities. This can occur when quickly pulling out into otherwise slow traffic or surging forward in heavy traffic. Alternatively, starting an engine poses a challenge because its torque is not available instantaneously. An annoying lag in performance will occur if the engine is not started somewhat in advance of the actual engine torque requirement.

An HEV system controller (VSC) must, therefore, control two mode transitions. The first is the transition from a vehicle at rest with the engine off to a vehicle using electric power. The second is the transition from electric driving to engine power in response to an increase in driver demand. (This driver demand transition should not be confused with a less time critical version of the same transition when the engine is started because of a need to charge a battery.) The timely preparation for these transitions is achieved by "anticipators".

A converterless multiple ratio automatic transmission of the kind that may be used in a parallel hybrid electric vehicle powertrain is shown in U.S. Pat. No. 6,217,479, where an engine crankshaft is connected through a damper assembly and a disconnect clutch to the torque input element of multiple-ratio gearing without an intervening torque converter. A slipping forward-drive clutch during an engine-engage operating mode is used, thereby avoiding a need for a separate startup clutch. The lack of a startup clutch, as well as the lack of a hydrokinetic torque converter, reduces the inertia mass which permits a faster response to a command force startup torque at the vehicle wheels.

A control strategy for a hybrid powertrain of the kind disclosed in the '479 patent is described in U.S. Pat. No. 6,364,807. The control strategy of the '807 patent includes a closed-loop clutch pressure modulation technique to effect a smooth transition from an electric motor drive mode to an internal combustion engine drive mode. This is done in cooperation with a control of the fuel supply during the transition. The electric motor in this HEV powertrain may act as an inertial starter, wherein the electric motor freely accelerates up to idle speed where the engine-driven pump has full hydraulic pressure for the clutch following continuously slipping clutch operation during startup.

Another hybrid vehicle powertrain using a multiple-ratio transmission without a torque converter and having a startup clutch located between the induction motor and the engine crankshaft is described in U.S. Pat. No. 6,176,808. An auxiliary launch torque is supplied by the motor during startup in the design of the '808 patent, and regenerative braking with the internal combustion engine inactive is available for charging the battery when the vehicle is in a coast mode.

In HEV operating strategies of the kind described in these prior art patents, the decision to start the engine in response to driver demand is based on vehicle speed and driving torque. The drive power is calculated using torque and motor speed. The total power required for the HEV is not only the drive power, but also power for all other loads, such as accessory load and climate control load. If this total required power exceeds a predetermined threshold for the motor, engine power and, therefore, engine start is required. If the total required power is below a predetermined value, the motor solely provides torque to the powertrain. A hysteresis loop is included in these predetermined values to prevent mode "chattering" when the vehicle nears these power thresholds.

A problem with this prior art system is apparent in an intermediate power range above the power below which it is more efficient to drive with the motor on (perhaps five to ten kW for a typical compact to mid-size vehicle), and below the peak electric-only power capability required for acceptable engine-off launch (twenty to forty kW for the same vehicle). While driving in electric-only mode, a momentary demand for power in this intermediate power range should be met without repetitive starting the engine, and then immediately stopping it. Therefore, a new anticipator strategy is required to improve efficiency and drivability of the HEV by anticipating the need for a driving state or mode change as close as possible to a predetermined optimal moment to create a seamless transition while reducing or eliminating engine "false starts".

It is possible to effect an instantaneous response of the powertrain to a driver command using a so-called feed forward torque calculation. This strategy would anticipate the torque requirements following a command for an increased torque or a decreased torque by calculating a leading indicator of engine torque. That indicator is used to develop a transmission line pressure that is appropriate for a subsequent ratio change and a subsequent driving torque requirement by anticipating the engine torque required following a response to an engine torque request by the driver. This torque feed-forward technique is further refined in a control system described in U.S. Pat. No. 6,253,140 where the engagement of the clutch, as the gear ratio change nears completion, is controlled with a pressure-shaping function used to reduce the desired slip rate to effect a smooth termination of the slip of one friction element as a companion friction element during a ratio change gains torque-transmitting capacity. This is achieved using an adaptive engagement technique so that the engagement characteristics of the controller can be learned during a ratio change and used in a subsequent ratio change. In this way, ratio change smoothness can be achieved by compensating for driveline variables such as changes in coefficients of friction due to clutch wear, for example, and due to changes in spring loads at the friction element actuators.

Another example of a converterless multiple-ratio transmission is described in U.S. Pat. No. 6,299,565 wherein the clutches, during a ratio change, are controlled by a strategy that makes it possible to achieve maximum vehicle acceleration using a controllable wet clutch between the engine and the input of a synchronous transmission.

Another example of a hybrid electric vehicle powertrain is described in U.S. Pat. No. 6,316,904 wherein the induction motor is controlled using a speed sensorless controller.

The control systems of these prior art patents do not describe nor suggest an anticipator function for anticipating the need for a driving state change so that an optimal seamless transition between driving state modes can be achieved.

A successful "anticipator" function must predict either: 1) that the demand power is likely to remain higher than a motive power threshold, but well within the motor and battery capacities so that the engine will be started in as seamless a manner as possible; or 2) that the demand power is likely to exceed the motor and battery capacities within a very short time, and the engine should be started quickly in a "kick-down" fashion. In the latter case, sufficient motor torque must be held in reserve to compensate for the sudden load of the slewing engine.

SUMMARY OF THE INVENTION

Accordingly, an objective of the present invention is to improve the drivability and efficiency of a parallel hybrid electric vehicle (PHEV) powertrain system so that the vehicle has predictable drivability as perceived by the vehicle operator.

Specifically, it is an object of the present invention to provide a strategy to prevent unpredicted or undesired engine starts by anticipating the need for the vehicle engine, while not "false starting" the engine or allowing an annoying lag in the engine's performance. This is achieved by the control of the present invention by monitoring both vehicle speed and driver demand, as well as their rates of change.

It is a further objective of the invention to provide an anticipator strategy that is a mathematical function of a predetermined set of system variables such as master cylinder brake pressure (MCP), throttle position, vehicle speed, vehicle mass, and road grade, including any rates of change of these system variables. Estimates of time remaining from the instant of estimation to the moment at which the vehicle system cannot meet the driver demand in the present mode are calculated. When the anticipated time remaining before the incipient transition approaches the time required to smoothly execute that transition, a transition command is executed.

DETAILED DESCRIPTION OF THE DISCLOSED EMBODIMENT

Figure 1:
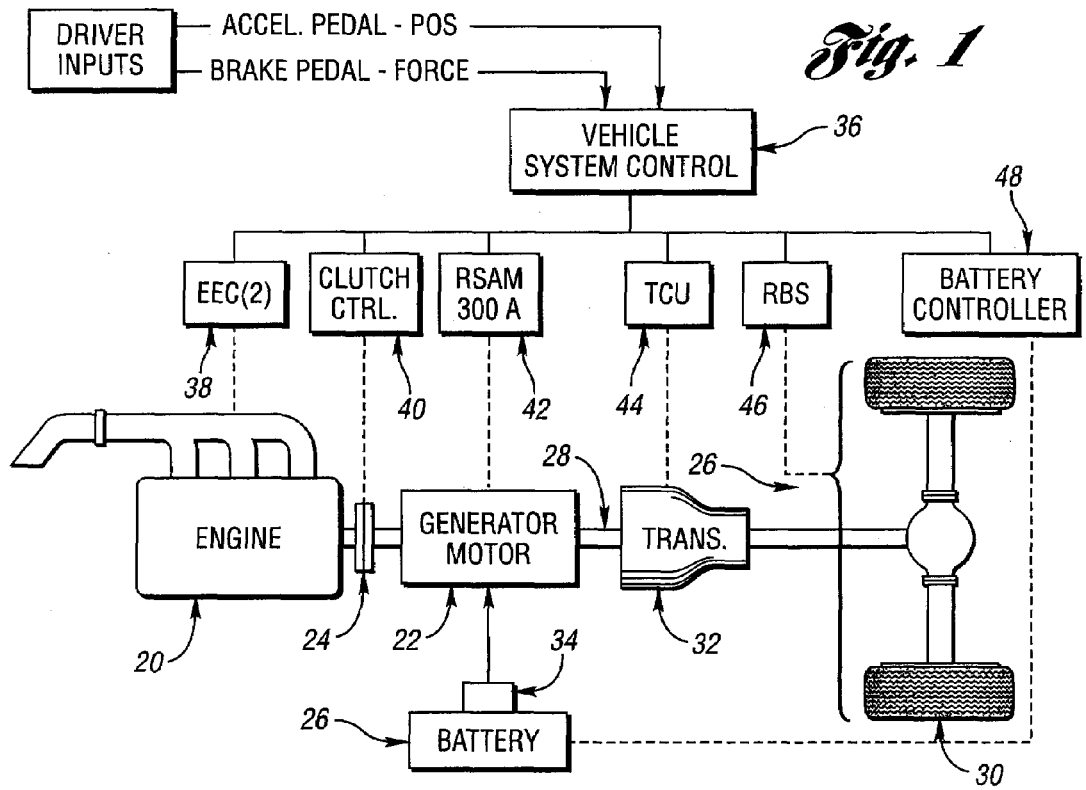
FIG. 1 illustrates the general components of a hybrid electric vehicle (HEV) powertrain with an engine disconnect clutch and a vehicle control system.

The invention could be applied to a variety of hybrid electric vehicle powertrain configurations, but two configurations are disclosed as examples. FIG. 1 shows components of a pre-transmission parallel HEV powertrain with an engine disconnect clutch. This pre-transmission configuration is described in co-pending U.S. patent application Ser. No. 10/225,824, filed Aug. 22, 2002, now U.S. Pat. No. 6,746,366, which is assigned to the assignee of the present invention.

An engine 20, shown in FIG. 1, is linked to an electric motor/generator 22 via a disconnect clutch 24. A battery 26 is connected to the motor/generator 22 via an inverter 34, which controls a flow of electrical power to and from the two components. The motor/generator 22, which may be referred to as a drive unit, is connected to a power transfer device 28, such as a drive shaft, which is connected to vehicle traction wheels 30 via a transmission 32. Thus, torque flows from the engine 20 and motor/generator or drive unit 22 through the power transfer device 28 to the wheels 30.

All powertrain components are under the supervisory control of a vehicle system controller (VSC) 36. Each powertrain component has a separate controller under that supervisory control of the VSC 36.

An engine control unit 38 controls the engine 20. For this application an electronic throttle control (ETC) would be used. The disconnect clutch 24 is under the control of a clutch control unit 40. The motor/generator 22 is under the control of a motor/generator control unit 42. The transmission 32 is under the control of a transmission control unit 44.

In the embodiment of FIG. 1, the transmission 32 is an electronic converterless transmission (ECLT), which will be described with reference to FIG. 7. The ECLT is a synchronous, high-efficiency, power-shifting transmission derived from a current mass-production product known in the prior art. Torque amplification function of the torque converter is provided by the motor/generator drive unit 22. The motor/generator 22 is also used for shift synchronization and dynamic control.

A vehicle brake system control unit is under the control of a regenerative braking system control unit 46, and the battery 26 is under the control of a battery control unit 48. The control units 38-48 comprise a powertrain control system.

Since the engine 20 can be disconnected from the motor/generator 22 and power transfer device 28, there are three potential powertrain states. These states, which are based on various vehicle demands and commands for the VCS 36, include: the engine 20 only, the motor/generator drive unit 22 only, or the engine 20 and the motor/generator drive unit 22 combined. The disclosed embodiment of this invention is a strategy to determine when the engine should be turned on and off based on driver demand.

Figure 2:
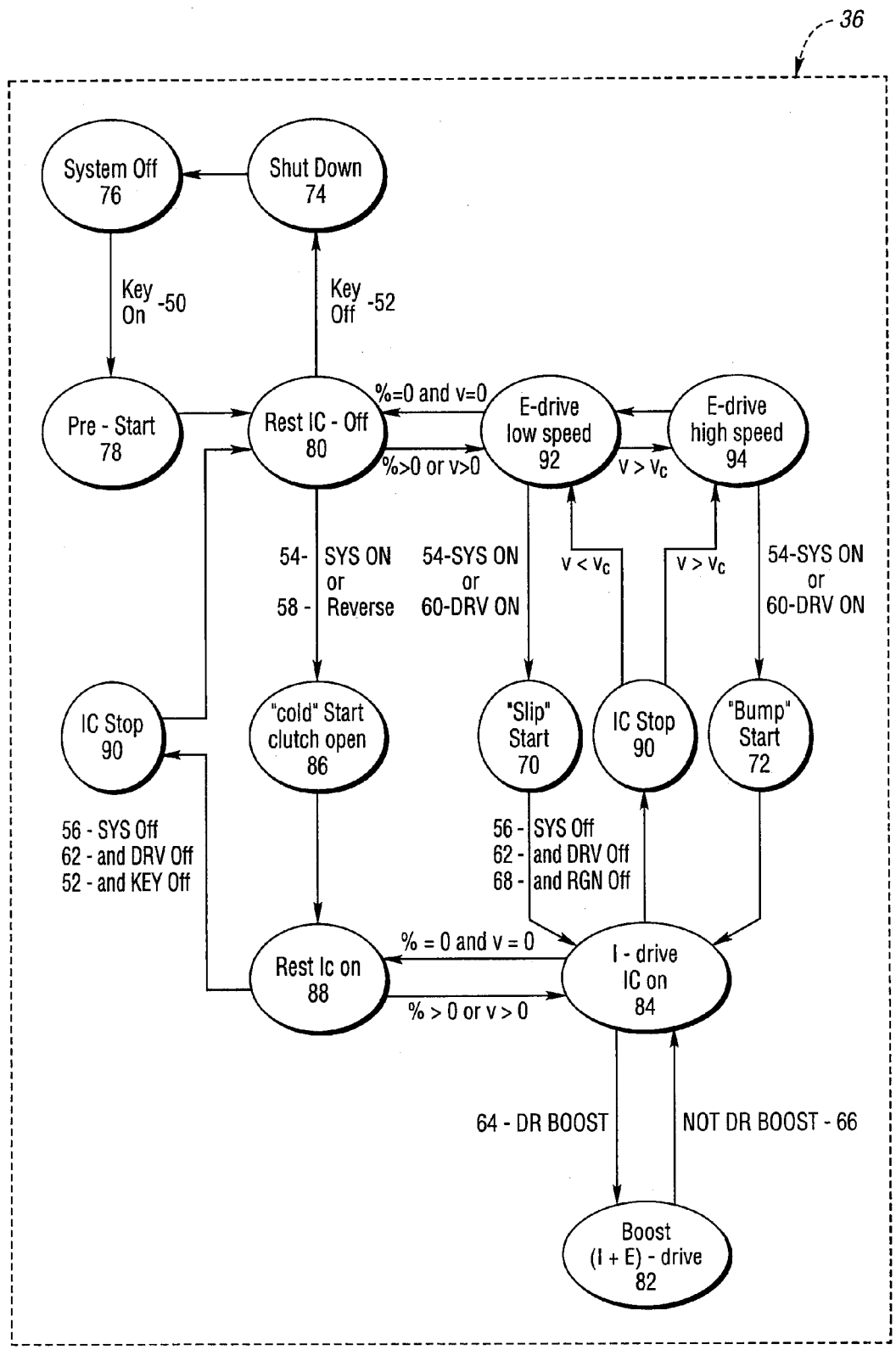
FIG. 2 illustrates a hybrid electric vehicle (HEV) state determination diagram.

A simple state algorithm within the vehicle system control 36 of an HEV is illustrated in FIG. 2. In this Figure, the circles indicate intrinsically transient ("self-exiting") states of starting and stopping vehicle systems, including starting and stopping the engine.

This state algorithm has several "flags" and parameters controlling transitions among the different vehicle states in FIG. 2. A "KEY ON" flag 50 and a "KEY OFF" flag 52 are self-explanatory. The KEY ON flag 50 results in a pre-start state 78, proceeding to a REST IC-OFF 80, whereby the engine 20 is off. The KEY OFF flag 52 results in a vehicle shutdown state 74 command followed by a system-off state 76.

SYS ON and SYS OFF flags 54 and 56 reflect a "basket" of conditions that require starting the engine for reasons other than to satisfy a driver's demand for powertrain torque under the current vehicle conditions (speed, grade, etc.). These include, but are not limited to: the engine 20 temperature below a predetermined value; an after treatment system temperature below a predetermined value; an air conditioner set to its maximum value; low battery 26 state of charge; and gear selector "PRND" in a reverse position 58. The engine 20 must be started when any one of these conditions exist, and can be shut down only when none of these conditions are in effect.

The Rest IC-OFF State 80 moves to a "cold" start clutch-open state 86 or to a Rest IC on state 88 with the SYS on flag 54 or Reverse flag 58. The DRV ON and DRV OFF flags 60 and 62 indicate the need to start or stop the engine 20 based on driver demand "%" (such as accelerator position) and present vehicle speed "v". The DRV ON and DRV OFF flags 60 and 62 will be set and cleared based on a map of % and v. Other considerations, such as d %/dt (rate of change of accelerator position) and grade (if "identifiable"), could also be included.

A DR BOOST flag 64 indicates that driver demand can only be met with a combination of motor/generator 22 and engine 20 power. This is the Boost (I+E)-drive condition 82. The NOT DR BOOST condition 66 means driver demand does not require the combination.

The RGN OFF flag 68 indicates that regenerative braking is occurring. This condition is used to postpone the engine 20 shutdown while significant negative torque is transmitted through the vehicle powertrain, thus preventing what might otherwise be unpleasant braking behavior. Note that regenerative braking can actually take place without master cylinder pressure (MCP) or brake touch, and even with slight throttle.

The "%" is simply an accelerator position in percent representing its full range of 0 to 100 percent. The "$V_c$" notation is a speed below which the motor/generator drive unit 22 is turning too slowly to at that instant "BUMP start" 72 the engine 20 simply by closing the disconnect clutch 24 leading to an I-drive IC ON state 84, whereby the engine 20 is on. The engine 20 would spin to below idle speed or be turning too slowly to deliver the requisite torque. The motor/generator drive unit 22 must be spun up by a combination of downshifting the transmission and allowing the drive-away clutch to slip—thus the term "slip start" 70.

The Rest IC ON state 88 transitions to an IC stop 90 state with the SYS OFF flag 56, DRV OFF flag 62, and the KEY OFF flag 52, and then back to the REST IC-OFF 80 state. The Rest IC ON state 88 also can transition to the I-Drive IC ON state 84 when (using terms defined above) %>0 or V>0. The I-Drive IC on state 84 can also transition to the Rest IC ON state 88 when %=0 and V=0.

The Rest IC OFF state 80 transitions to an electric E-drive low speed state 92 when (using terms defined above) %>0 or V>0. The E-drive low speed state 92 can also transition to the rest IC ON state 88 when %=0 and V=0.

The electric E-drive low speed state 92 transitions to the "slip" start state 70 when there is a SYS ON flag 54 or a DRV ON flag 60 that results in the I-Drive IC ON state 84. The I-Drive IC ON state 84 can transition to the IC STOP 90 state with the SYS OFF flag 56, DRV OFF flag 62, and RGN OFF flag 68.

The IC STOP 90 state and an E-drive high speed state 94 transition to the electric E-drive low speed state 92 when V<$V_c$. The IC STOP 90 state and the E-drive LOW speed state 92 transition to the E-drive high-speed state 94 when V>$V_c$. Finally, the E-drive high-speed state 94 transitions to the "BUMP" start state 72 with the SYS ON flag 54 or the DRV ON flag 60.

In determining state transitions from a purely fuel economy perspective, all powertrain torque below a fairly low motive power threshold, typically in the range of 5 kW to 12 kW for a compact or mid-size vehicle, should be electric. When the engine 20 is on, it should be delivering at least the threshold power for the combined load of the vehicle requirements and battery charging load. The threshold represents an efficiency crossover point 110 in FIG. 6. Thus, small errors in the exact value do not have a major effect on fuel economy.

Figure 6:
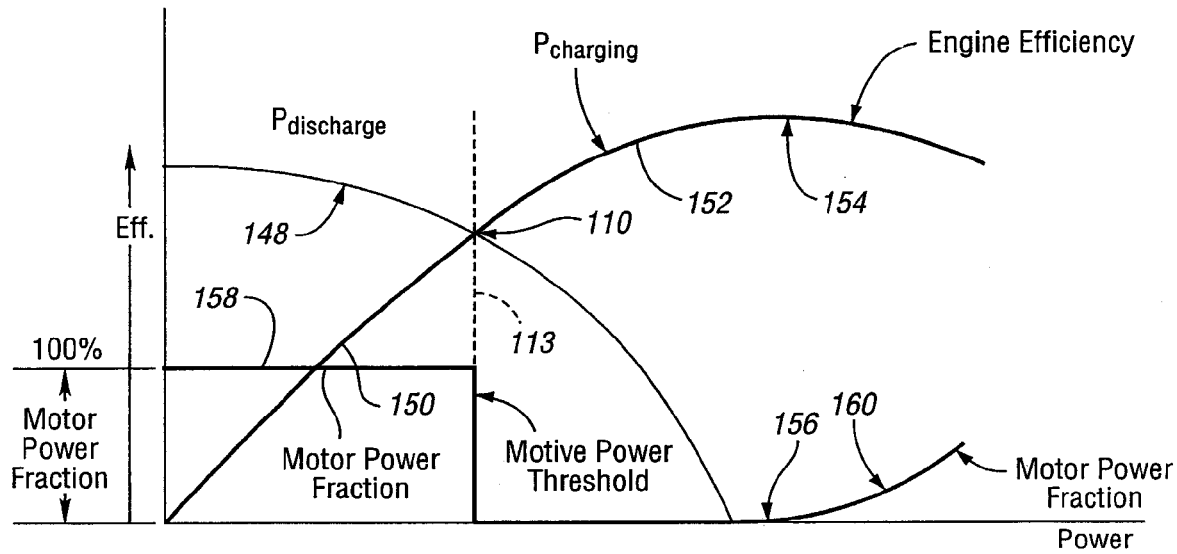
FIG. 6 is a plot of effective engine operating efficiency and motor operating efficiency as a function of power.

Adding driver demand to the transitions takes into account at least two considerations: 1) whether the instantaneous power demand at the present vehicle speed exceeds the motive power threshold 113 in FIG. 6; and 2) whether the anticipated time at which the demand for power at the present accelerator position and rate of vehicle acceleration will become less than the time it will take to start the engine 20 (conservatively 0.7 seconds). A representative demand function is shown in FIG. 3 at 102.

Figure 3:
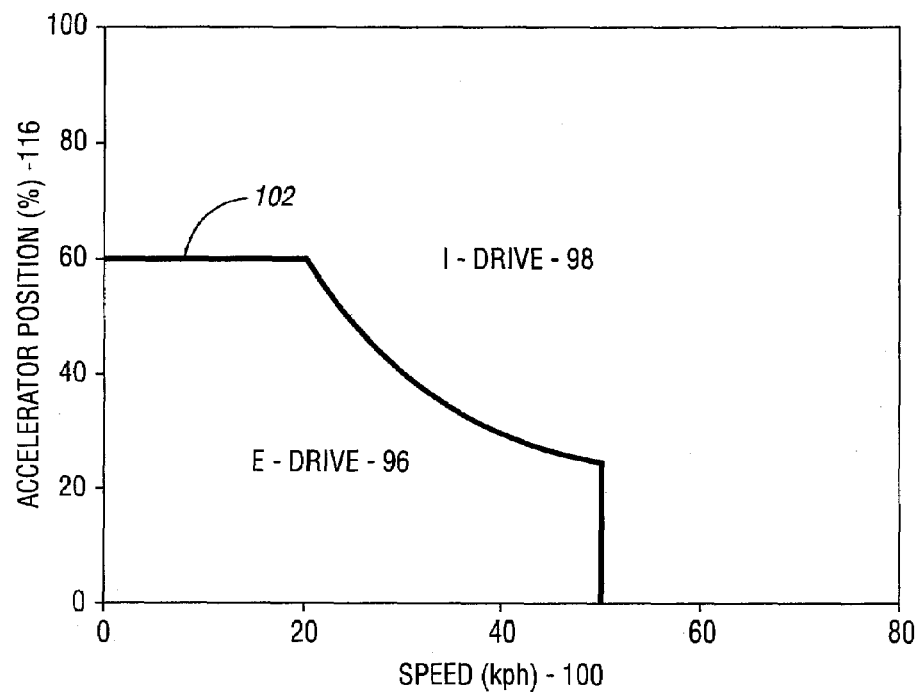
FIG. 3 illustrates a hybrid electric vehicle (HEV) driver demand function.

FIG. 3 illustrates an electric drive (E-drive) zone 96 and an engine drive (I-drive) zone 98 as a function of accelerator position 116 and a vehicle speed 100. This is roughly the equivalent of a function of torque and vehicle speed. The specific curve 102 is only a suggestion and should be treated as a calibratable threshold parameter for starting the engine 20. However, it must always lie within—possibly just within—the actual capabilities of the electric drive. For optimal fuel economy, it should lie near the locus of the motive power threshold, as it would appear on FIG. 3.

When using the disclosed embodiment and the above described engine startup procedure, the anticipator function uses the value and rate of change of the input parameters. In this case, the driver accelerator position "%" and vehicle speed "v", which together can be used to compute power demand "P" and estimate the time remaining until the power demand exceeds some threshold near the maximum capability of the electric drive system.

In the described embodiment of the invention, the anticipator for the first of these transitions—"get ready to drive"—is used to pre-spin the drive motor to its "idle speed." This generates hydraulic pressure in preparation for delivering torque to the wheels. The motor/generator 22 is turned off and the inverter 34 is put in a "sleep mode" as much as possible to minimize the parasitic electric load. The "get ready to drive" anticipator will consider: vehicle speed (motion in either direction signals the need or motive power); throttle touch (any finite value that signals the intent to launch); brake switch (e.g., removing the foot from the brake signals the intent to launch); brake master cylinder pressure (MCP); and the rate of decrease in brake pressure given by the formula d(MCP)/dt (i.e., a rapid decrease in brake pressure signals the intent to launch).

Of these four, the rapid decrease in brake pressure is of special interest. A decreasing brake pressure, even with finite pressure remaining, can signal the intent to launch well in advance of the actual driver expectation of torque in response to the throttle touch that will occur a large fraction of a second later. Thus the anticipator can bring the motor/generator drive unit 22 to its "idle" speed before the demand actually appears. Therefore, it is "anticipated".

The second critical transition, "switch to engine power", is somewhat more complex. Here, it is important to avoid "false starts" in which the engine 20 is started just above the motive power threshold only to be shut off a moment later, while also avoiding "stumbles" in which the demand power exceeds the capabilities of the drive motor before the engine can be brought in. The HEV system design must leave ample margin between the motive power threshold the motor/generator 22 capabilities. The "switch to engine" anticipator will consider:

Vehicle speed: "v"
Rate of acceleration: dv/dt
Throttle position: "%"
Rate of change of throttle: d(%)/dt
Mass/grade: It may be possible to identify the actual vehicle mass and possibly road grade and adjust the operating strategy accordingly.

Figure 4:
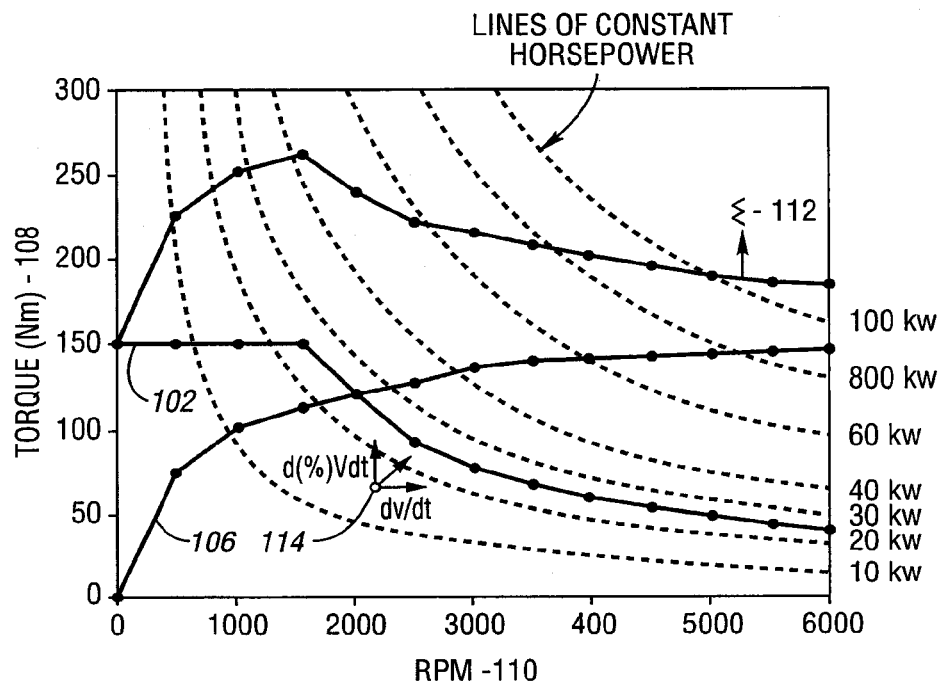
FIG. 4 illustrates a hybrid electric vehicle (HEV) speed-torque map.

The anticipator strategy of the invention requires the motor/generator drive unit 22 to operate as a pseudo-engine such that overall vehicle control remains largely unchanged irrespective of whether the engine 20 is running. The torque capabilities of each in isolation and in combination are illustrated in FIG. 4. FIG. 4 is intended as a starting point for defining a relationship between driver demand as determined by accelerator position and vehicle speed and motor/engine torque.

FIG. 4 illustrates an electric drive torque map 102 and an engine drive torque map 106 as a function of torque 108 and speed 110. A Sum torque 112 combines the electric drive torque map 102 and the engine drive torque map 106. Both torque curves are oversimplified. The battery-limited torque curve of one HEV embodiment is approximated as a 25 kW motor. A more capable battery would extend the constant-torque region to over 2500-rpm.

FIG. 4 also has a "switch to engine" anticipator 114 with an open circle that represents instantaneous values of vehicle speed and driver demand well above the motive power threshold (10 kW), but well below the limits of the electric drive (25 kW). The length of the horizontal vector is the rate of vehicle acceleration, and the vertical vector is the rate of change of the driver demand. Both are multiplied by the estimated time required to start the engine (e.g., 700 ms), then summed to extrapolate to the new position expected 700 ms hence. In FIG. 4, the extrapolated position—the anticipator point—lies on the locus of drive motor capability, indicating that it is time to start the engine 20.

If the tip of the anticipator falls below the motive power threshold due to decreasing speed and/or demand, the engine should not be started. When the anticipator vector lies within the motor capability, the decision to start the engine is made on the basis of efficiency. This decision is based on some combination of a running average of demand power and imposed hysteresis in the motive power threshold (e.g., using an upper threshold for starting, and a lower one for engine shutoff). Accidentally running on the engine 20 power just below the threshold, or running the motor/generator 22 just above, does not impose a significant fuel economy penalty. The wide gap between the motive power threshold and motor/generator 22 capability is deliberately designed into the HEV system to allow occasional, but brief, periods of high motive power without forcing the engine 20 to start for what may prove to be only a very short time.

Because the system spends very little time in this rather inefficient mode (because the running power average mounts very rapidly), this strategy does not undermine fuel economy. With calibration of the anticipator functions, possibly including higher order polynomials or other non-linear functions, and careful construction of the power averaging function, the optimal energy management strategy can be realized with no operational annoyance, false starts and stumbles.

In the disclosed embodiment of the present invention, motive power threshold, where the engine 20 needs to be started, can be shown algebraically as:

$$P = a \times T_q \times V;$$

$dP/dt = a \times T_q \times dV/dt + a \times \text{Speed} \times dT_q/dt$; where "a" is a constant. The time "T" remaining before crossing the threshold is given by:

$$T = (P_{max} - P)/(dP/dt)$$

If there is also a maximum torque limit, as in FIG. 4, the time to reach that limit must also be computed as:

$$T = (T_{qmax} - T_q)/(dT_q/dt)$$

If, for example, it takes one second to start the engine 20 and bring it up to some target power output, the start process of engine 20 will be initiated when the "anticipator time" falls below one second. Use of the anticipator function to determine whether to start the engine 20 in response to increasing power demand will minimize the frequency of "false starts", after which the demand power is high only for a brief period and never exceeds that of the motor/generator 22, while ensuring that the engine 20 will start in time to provide power if needed.

Anticipators can also determine whether to shut the engine 20 off in response to a sudden decrease in demand power simply by choosing a lower power threshold. An HEV braking system's master cylinder pressure (MCP) and its time rate of change can also be included in this anticipator function.

Figure 7:
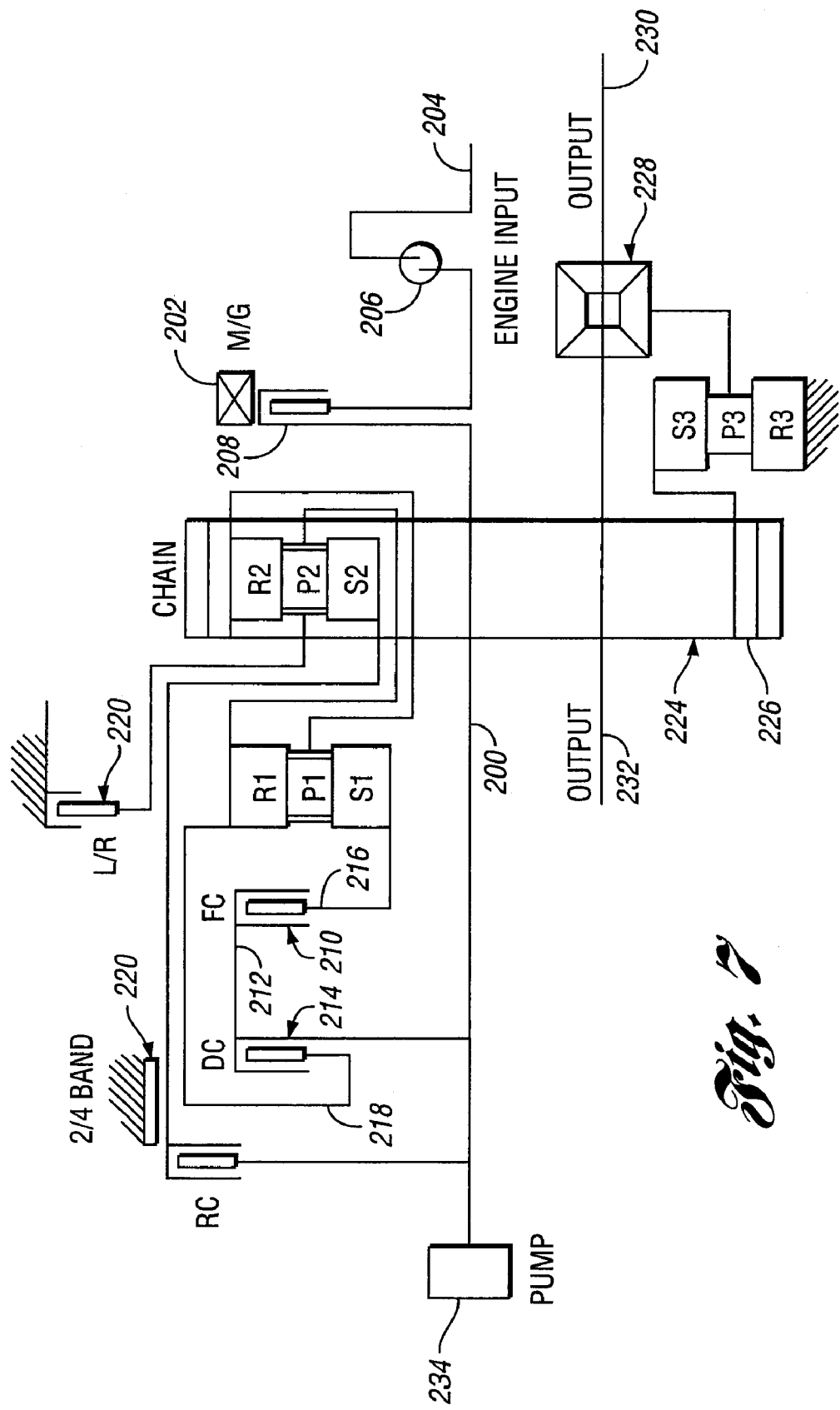
FIG. 7 is a schematic representation of a multiple-ratio, converterless, planetary gear transmission capable of being used with the hybrid electric vehicle powertrain of FIG. 1.

FIG. 7 shows in detail a typical converterless transmission that could be used in the hybrid electric vehicle configuration of FIG. 1. The transmission includes a torque input shaft 200 that receives torque from the M/G 202, the engine, or the MG 14 and the engine. The engine crankshaft is shown at 204 and a damper is shown at 206. The transmission input shaft 200 is operatively connected to a first portion 208 of a disconnect clutch and to forward clutch (FC) 210. The first portion 212 of the forward clutch 210 is also the first portion of a direct clutch (DC) 214. The forward clutch 210 and the direct clutch 214 each have respective second portions 216 and 218, which are operatively connected to a respective torque delivery element within the transmission.

The second portion 216 of the forward clutch 210 is operatively connected to a first sun gear (S1) and the second portion 218 of the direct clutch 214 is operatively connected to a first ring gear (R1). As shown in FIG. 7, a first planetary gear set, which includes the ring gear R1, the sun gear S1 and planetary carrier (P1), is operatively connected to a second planetary gear set. The secondary gear set includes a second sun gear (S2), which is connected to a reverse clutch (RC). As shown in FIG. 7, the reverse clutch RC, which includes a friction brake 220, is also operatively connected to transmission input shaft 200.

The second planetary gear set also includes a planet carrier (P2), which is connected on one side to the ring gear R1, and on the other side to a low-and-reverse brake (L/R) 222. A ring gear R2 defines a sprocket for a chain drive, indicated generally at 224. The chain drive 224 drives a sprocket 226, which in turn drives a sun gear (S3) of a third planetary gear set.

A ring gear (R3) for the third planetary gear set is grounded to a housing of the transmission, while planetary carrier (P3) is attached to differential gearing 228. The differential gearing 228 is operable to transfer driving torque to each of two axle half shafts 230 and 232. A detailed cross sectional view of an embodiment of a transmission, such as the transmission of FIG. 7, 16, is shown in U.S. Pat. No. 6,585,066 issued to Koneda et al. on Jul. 1, 2003, which is incorporated herein by reference. Also shown in FIG. 7 is pump 234, which is operable to provide pressure to the transmission clutches.

In the operation of the HEV system of FIG. 1, the motor/generator drive unit 22 must be spinning in order for the transmission to carry torque. However, to reduce energy consumption it is desirable to stop the motor/generator 22 when possible and turn it off always when the vehicle is at rest. In a simple implementation, a touch of the accelerator, any vehicle motion, or removal of brake force can be used to trigger the restart of the motor/generator drive unit 22. However, such a simple control might result in an annoying delay in vehicle launch. An anticipator that observes the force on a brake and its rate of change to compute the time remaining before vehicle motion can begin or would begin in a conventional vehicle in which "creep" (forward motion with no touch to either brake or accelerator) can be used to signal the need to spin the motor. The system would be ready to deliver power even before the driver can actually demand it. In the case of the HEV in the disclosed embodiment of FIG. 1, a "false start" of the motor/generator 22 consumes little energy and my not be detectable.

Figure 5:
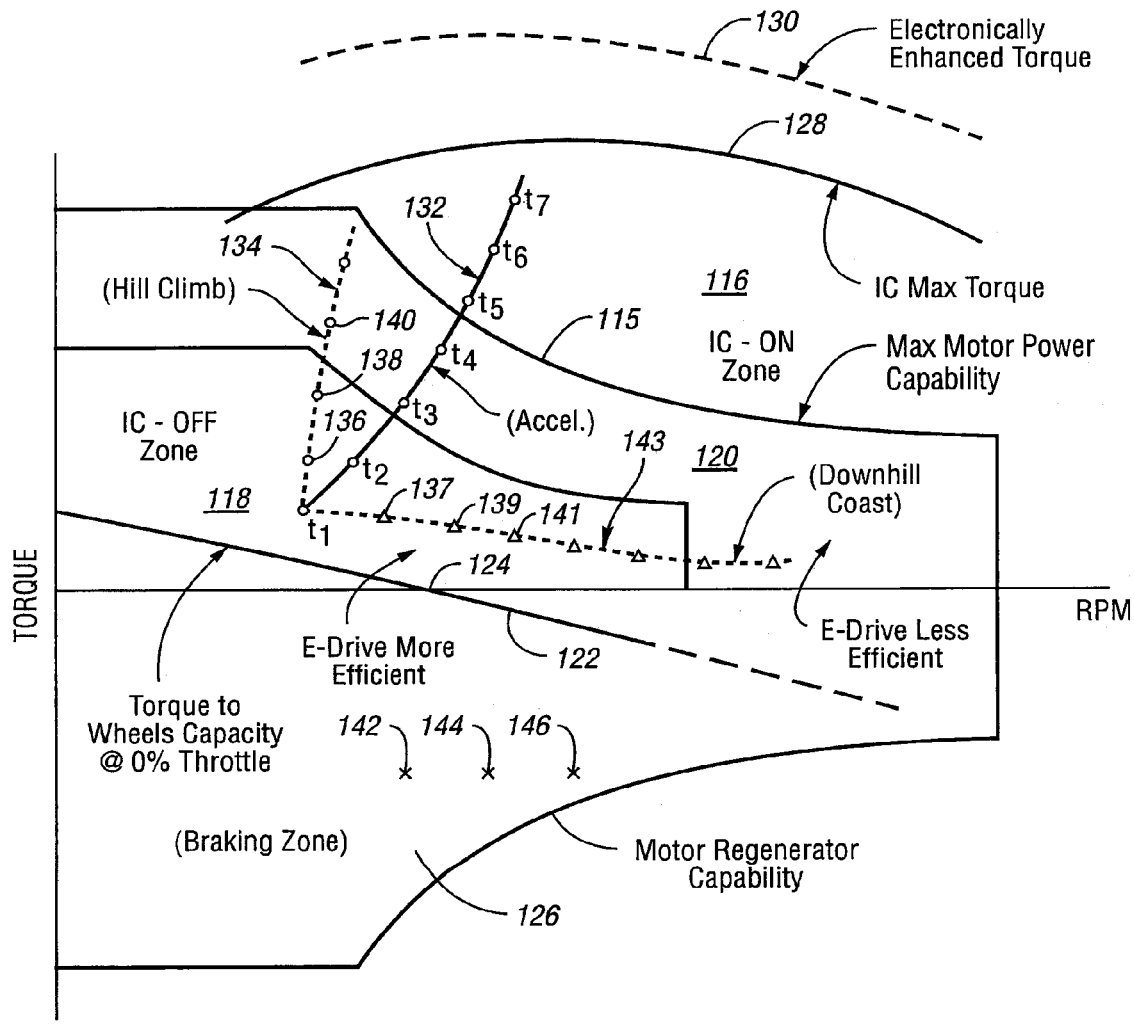
FIG. 5 is a plot that shows powertrain characteristics similar to those shown in FIGS. 3 and 4, but which includes a braking speed-torque zone where the motor acts in a regenerative mode.

FIG. 5 shows the relationship between torque and speed including the drive motor operating zone 96 and the engine operating zone 98 shown in FIG. 3. It shows in addition, however, the regenerative motor braking zone where the torque is illustrated as a negative value. In the positive torque part of the plot of FIG. 5, the power limit of the driving power capability of the motor is shown at 115. The engine operating power zone is shown at 116. The operating power zone for the motor that is characterized by a high motor efficiency is shown in FIG. 5 at 118. The engine is turned off while operating in power zone 118. When the powertrain operates in a region intermediate power zone 116 and power zone 118, which is shown at 120, the motor is effective, but it is less efficient than it is in power zone 118.

The braking capacity of the powertrain is shown in FIG. 5 by the linear relationship 122. A positive torque typically is delivered from the engine to the traction wheels when the throttle is closed, as shown by the portion of line 122 on the left side of the zero crossover point 124. As the speed increases, a regenerative braking torque is established in the negative braking zone 126.

Curve 128 represents an internal combustion engine torque curve. The sum of the motor torque and the engine torque is represented by curve 130.

During the acceleration mode, the speed and torque value at time T1 shown in FIG. 5 is in the motor drive efficient operating zone 118. If the value for speed and torque again is measured in a subsequent control loop at time T2, the value of the torque will be greater during acceleration. If the acceleration mode continues, progressively increasing torque values are effected at times T3, T4, T5, T6 and T7 as shown at 132. If the time required to start the engine is 700 ms, for example, and the estimated time at point T4 is 700 ms from the anticipated time needed to reach the available capacity of the motor drive, the engine will be commanded to start. Thus when the motor loses sufficient driving torque capability while the powertrain is operating within region 120, the engine will have come up to speed and is capable of delivering the needed driving torque in a seamless fashion.

The speed torque values detected during operation in the motor drive zone are defined by a plot 132, which has an upward trend representative of the acceleration mode. If the vehicle is being accelerated while climbing a hill, the slope of the speed torque plot is much steeper, as shown at 134. The speed torque values detected at various instants corresponding to time T1, T2, T3, etc., are shown in FIG. 5, respectively, at 136, 138, 140, etc.

If, as in the case of plot 132, the time at which the plot 134 approaches the limit of the motor driving capability is equal to the pre-calculated time to start the engine (e.g., 700 ms), the engine will be started. Thus, vehicle acceleration is one of the conditions that can be used in an anticipatory strategy.

If the vehicle is in a downhill coast, the plot of speed and torque values at times corresponding to time T1, T2, T3, etc. is shown at 143. Speed and torque values may be determined at times 137, 139, 141, etc. When a point on plot 143 is 700 ms, from the motor/generator capability plot, for example, the vehicle wheel brakes will be applied.

If the motor is operating in the braking zone, repetitive speed torque readings are made, for example, at time values 142, 144, 146, and it is determined at point 146 that a time of 700 ms separates that point from the motor/generator capability plot, the vehicle friction brakes will complement regenerative braking.

FIG. 6 is a plot of the powertrain efficiency versus speed. The efficiency of the driveline during battery discharge in the motor drive zone with the engine off is shown at 148. At that time, the engine efficiency, because of the speed-torque characteristic of the engine, would have a much lower efficiency as shown at 150. As the speed increases, the engine efficiency increases and the motor efficiency decreases. At the crossover point 110, the engine is turned on and the battery is in a charging state, as shown at 152.

At the peak of the engine curve as shown at 154, the fraction of the motor power is low or zero, as shown at 156. This is in contrast to the fraction of the motor power at lower speeds, which is 100 percent, as shown at 158. At the motive power threshold 113, the motor power is replaced with engine power. After the peak engine efficiency is reached at 154, engine efficiency drop occurs. This would correspond to an increase in the motor power fraction, as shown at 160.

The overall power is equal to the sum of the battery power plus internal combustion engine power. The effective overall efficiency for the entire powertrain is a product of the efficiency of the power transmitted by the engine to the transmission and the power required to charge the battery, times the efficiency of the generator during charging of the battery, times the efficiency of the battery during charging, times the efficiency of the battery during discharge, times the efficiency of the motor during discharge.

Other vehicle conditions and control parameters can be used in anticipator strategies. Also, functions more complex than the simple linear relationships described here can also be used to improve the overall driving characteristics of the system.

Figure 8:
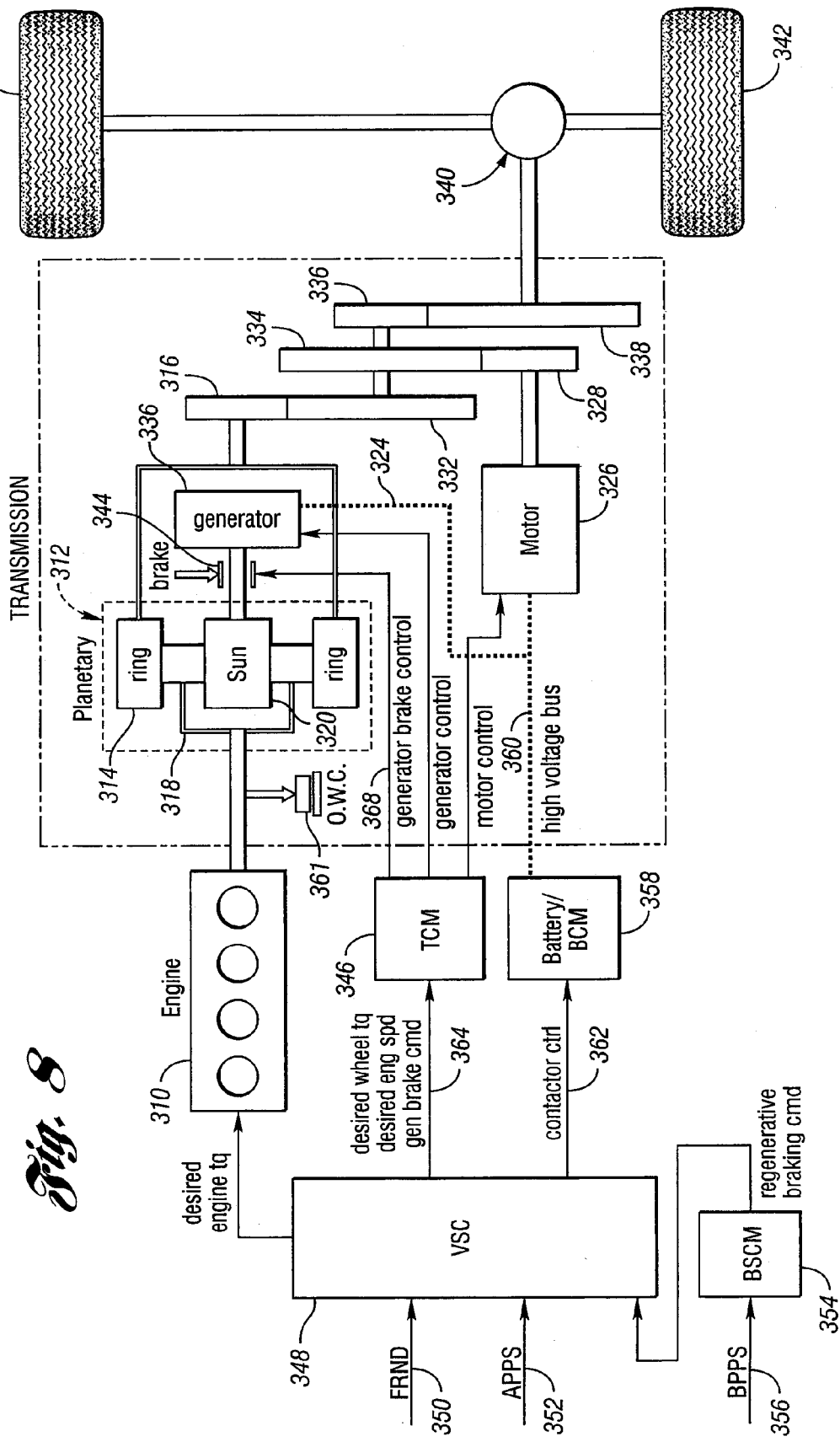
FIG. 8 is a schematic representation of a hybrid electric vehicle powertrain with a divided power flow path in a parallel-series configuration with planetary gearing capable of embodying the present invention.

The powertrain configuration of FIG. 8 is a divided power, parallel-series configuration. It includes an internal combustion engine, as shown at 310. A planetary gear set 312 includes a ring gear 314, which is connected driveably to a torque input countershaft gear element 316. The engine torque output shaft is connected driveably to carrier 318 for the planetary gear unit 312. Sun gear 320 of the planetary gear unit 312 is connected driveably to generator 322. The generator is electrically coupled, as shown at 324, to a high voltage electric motor 326, which may be an induction motor. The output rotor of the motor is connected to gear element 328 of torque output countershaft gearing 30. Countershaft gear 332 engages gear 316. A countershaft gear of larger pitch diameter, shown at 334, driveably engages motor output drive gear element 328. A smaller pitch diameter countershaft gear element 336 driveably engages torque output gear 338, which distributes torque to a differential-and-axle assembly 340 to deliver driving torque to vehicle traction wheels 342.

A generator brake 344, when applied, anchors the rotor of generator 336, which also anchors sun gear 320. When the generator brake is applied, a mechanical torque flow path from the engine to the differential-and-axle assembly 340 is established. This is referred to as a parallel driving mode. When the brake 344 is released, reaction torque of the generator establishes torque reaction for the sun gear 320 because of the direct mechanical coupling between the sun gear and the generator rotor. Engine speed thus can be controlled by controlling the generator torque.

The generator torque is under the control of transmission control module 346, which communicates with vehicle system controller 348. Input variables for the vehicle system controller 348 include a driver-controlled drive range selection at 350 and a signal from an accelerator pedal position sensor 352. Another driver input for the vehicle system controller is a regenerative braking command from module 354, which receives a brake pedal position sensor signal 356.

Battery 358 is connected to the generator 336 and to the motor 326 through a high voltage bus 360. The battery is under the control of the vehicle system controller by means of a contactor control signal at 362.

The transmission control module receives from the vehicle system controller a desired wheel torque signal, a desired engine speed signal and a generator brake command as shown at 364. The transmission control module 346 distributes a generator control signal through signal flow path 368 that extends from the module 346 to the brake 344.

Figure 9:
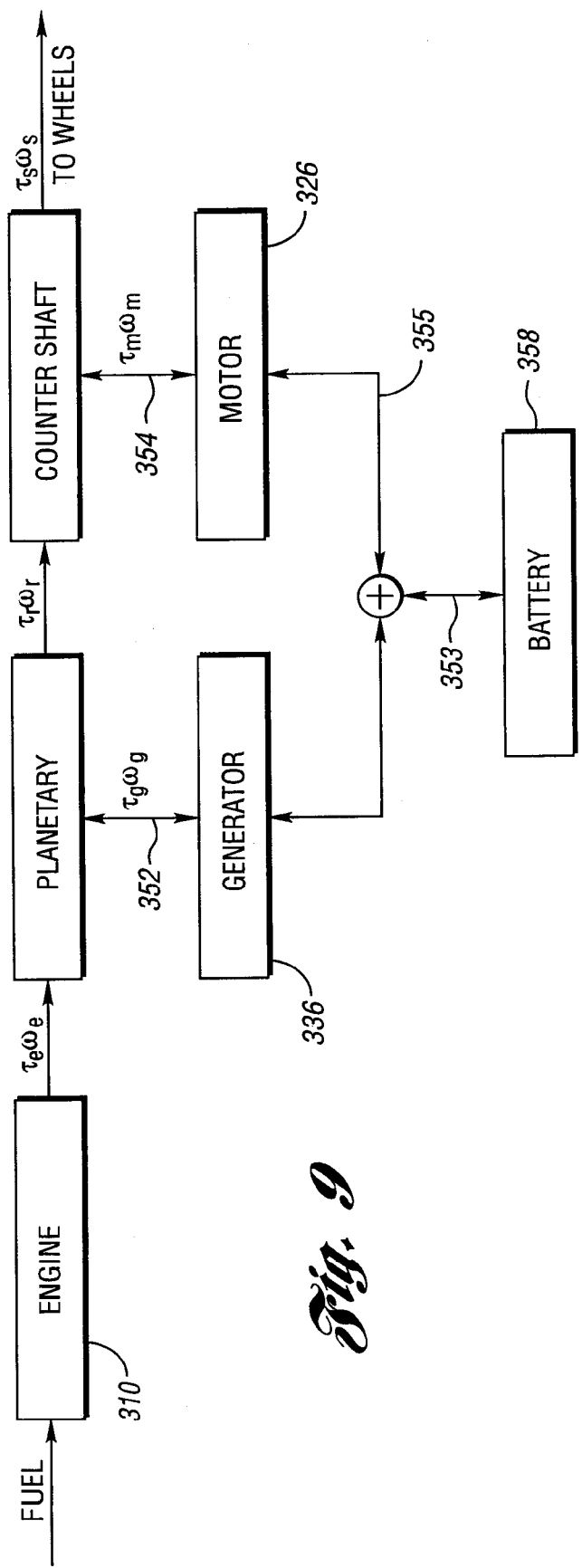
FIG. 9 is a diagram of power flow paths between the elements of the powertrain of FIG. 8.

The power flow paths between the various elements of the power dividing powertrain shown in FIG. 8 are illustrated in FIG. 9. Fuel is delivered to the engine 16 under the control of the operator in known fashion using an engine throttle. Engine power delivered to the planetary gearset 312 is expressed as $T_e \omega_e$, where $T_e$ is engine torque and $\omega_e$ is engine speed. Power delivered from the planetary ring gear to the countershaft gears is expressed as $T_r \omega_r$, which is the product of ring gear torque and ring gear speed. Power out from the transmission is represented by the symbols $T_w$ and $\omega_s$, the torque of gear 338 and the speed gear 338, respectively.

The generator, when it is acting as a motor, can deliver power to the planetary gearing. Alternatively, it can be driven by the planetary gearing, as represented in FIG. 9 by the torque flow path 352. Similarly, power distribution between the motor and the countershaft gears can be distributed in either direction, as shown in FIG. 9 by the torque flow path 354. Driving power from the battery or charging power to the battery is represented by the bi-directional arrow 353. Power flow between battery 358 and motor 326 is represented by bi-directional arrow 355.

Figure 11:
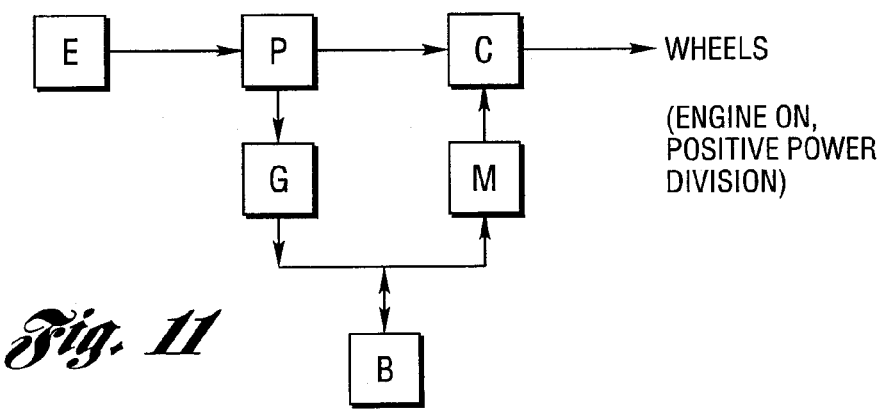
FIG. 11 is a diagram of the power flow paths for the powertrain of FIG. 8 during operation with both the engine and motor on during acceleration and steady-state driving modes.

As shown in FIG. 7, engine output power can be divided into two paths by controlling the generator speed. The mechanical power flow path, $T_r \omega_r$, is from the engine to the carrier to the ring gear to the countershaft. The electrical power flow path is from the engine to the generator to the motor to the countershaft. The engine power thus is divided so that the engine speed is disassociated from the vehicle speed during a so-called positive split mode of operation. This condition is illustrated in FIG. 11, where the engine 310 delivers power to the planetary gearing, which delivers power to the countershaft gears 332, 334 and 336. These gears in turn drive the traction wheels 342. A portion of the planetary gearing power is distributed to the generator 336, which delivers charging power to the high voltage battery 358. The speed of the generator then is greater than zero or positive, and the generator torque is less than zero. The battery drives the motor 46, which distributes power to the countershaft. This condition, seen in FIG. 11, has positive power division.

If the generator, due to the mechanical properties of the planetary gear unit, acts as a power input to the planetary gear unit to drive the vehicle, the operating mode can be referred to as a negative power division. This condition is shown in FIG. 12, where the generator speed is negative and the generator torque also is negative.

Figure 12:
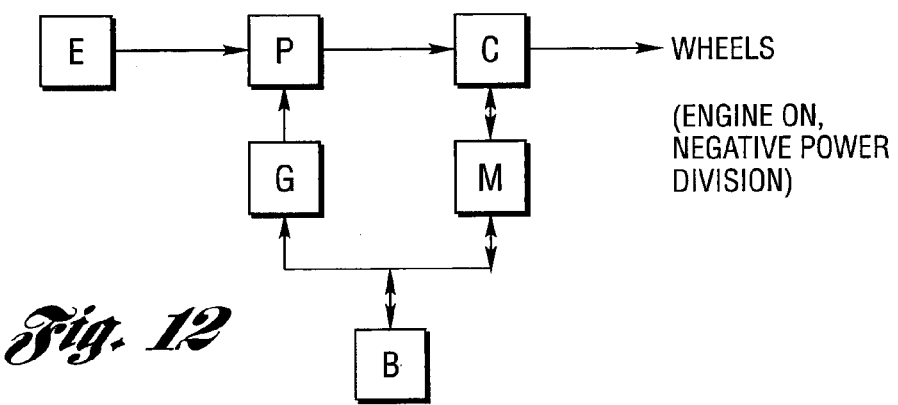
FIG. 12 is a diagram of the power flow paths for the powertrain of FIG. 8 during a power regenerative driving mode.

The generator in FIG. 12 delivers power to the planetary gear unit as the motor 326 acts as a generator and the high voltage battery 358 is charging. It is possible, however, that under some conditions the motor may distribute power to the countershaft gearing if the resulting torque at the traction wheels 342 from the gearing does not satisfy the driver demand. Then the motor must make up the difference.

Figure 13:
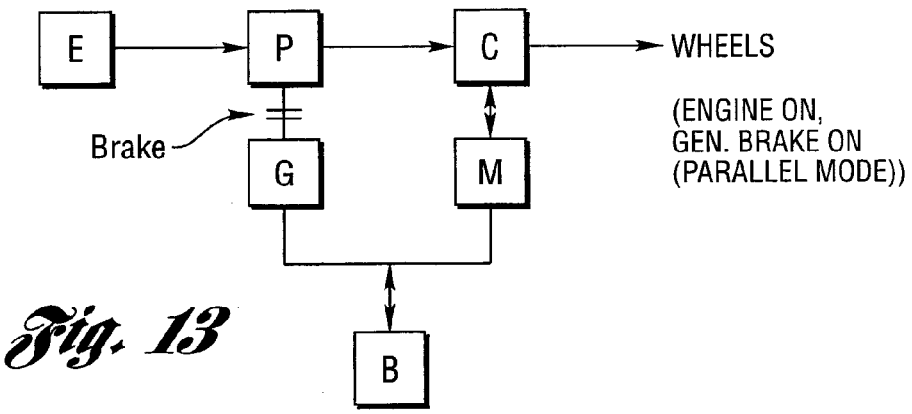
FIG. 13 is a diagram of the power flow paths for the powertrain of FIG. 8 during operation in a mechanical, parallel driving mode under engine power with the generator braked.

If the generator brake 344 is activated, a parallel operating mode is established. This is shown in FIG. 13, where the engine 310 is on and the generator is braked. The high voltage battery 358 powers the motor 326, which powers the countershaft gearing simultaneously with delivery of power from the engine to the planetary gearing and then to the countershaft gearing.

The first power source, as previously described, can deliver torque only for forward propulsion because there is no reverse gear in the countershaft gearing. The engine requires either generator control or a generator brake to permit transfer of power to the wheels for forward motion.

Figure 10:
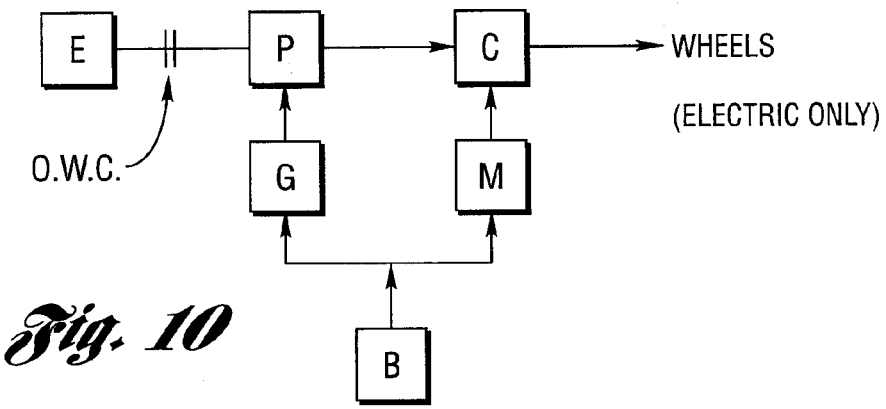
FIG. 10 is a diagram of the power flow paths for the powertrain of FIG. 8 during electric-only operation with the engine off.

The second source of power, as previously described, is the high voltage battery-motor-generator subsystem. This is illustrated in FIG. 10. In this driving mode, the engine is braked by the overrunning coupling 361. The electric motor draws power from the high voltage battery and effects propulsion independently of the engine, with either forward or reverse motion. The generator may draw power from the high voltage battery and drive against the reaction of one-way coupling 361. The generator in this operating mode operates as a motor.

As previously indicated, the two power sources are integrated so that they seamlessly work together to meet the driver's demand for power while maintaining optimum powertrain efficiency and performance. The system will determine the driver's demand for torque and achieve an optimum division of power between the two power sources.

Although one embodiment of the invention has been disclosed, it will be apparent to persons skilled in the art that modifications may be made without departing from the scope of the invention. All such modifications, and equivalents thereof, are within the scope of the following claims.

What is claimed:

1. A hybrid electric vehicle powertrain having an internal combustion engine with an accelerator pedal and a throttle controlled by a vehicle system controller that responds to accelerator pedal movement and vehicle brake pedal movement, an electric drive unit, a battery electrically connected to the drive unit for powering the electric drive unit;

a powertrain control system electrically coupled to the vehicle system controller including an engine speed and torque control, a drive unit speed and torque control and means for measuring rates of change of accelerator pedal position and vehicle brake pedal force whereby engine on and off states and drive unit on and off states are effected;

the drive unit having a power delivery first operating zone characterized by high efficiency drive unit power delivery within a maximum power capability, the engine having a power delivery second operating zone characterized by high efficiency engine power delivery;

the engine and the drive unit having an intermediate power delivery operating zone in which the drive unit operates with reduced efficiency and the engine may be started to develop driving torque; and means for anticipating an instant, during operation in the intermediate zone, when the maximum power capability of the drive unit is reached whereby the engine is started to effect a smooth power transition between the second and intermediate power delivery operating zones;

the powertrain control system including a brake pedal driver input, the control system responding to operating variables including a rate of change of brake pedal force and a rate of change of accelerator pedal position whereby the engine is started at a calculated time before the maximum power capability of the drive unit is reached with the powertrain operating in the intermediate operating zone.

2. The hybrid electric vehicle set forth in claim 1 wherein the powertrain comprises a planetary gear unit and the electric drive unit comprises a generator and a motor;

the planetary gear unit having a first element drivably connected to the generator, a second element drivably connected to the vehicle traction wheels and a third element drivably connected to the engine; and the motor being drivably connected to the vehicle traction wheels.

3. The hybrid electric vehicle set forth in claim 1 wherein the powertrain operating variables include vehicle speed and rate of vehicle acceleration.

4. The hybrid electric vehicle set forth in claim 1 wherein the powertrain operating variables include road grade.

5. The hybrid electric vehicle set forth in claim 1 wherein the powertrain operating variables include vehicle speed and rate of vehicle acceleration.

6. The hybrid electric vehicle set forth in claim 1 wherein the powertrain operating variables include road grade.

7. A hybrid electric vehicle with vehicle wheel brakes, a powertrain having a throttle-controlled internal combustion engine with an accelerator pedal and a throttle that responds to accelerator pedal driver input, an electric drive unit, and a battery electrically connected to the drive unit for powering the drive unit;

a powertrain control system including means for turning off the engine to effect power delivery solely from the battery and means for turning on the engine to effect power delivery selectively by the engine solely and by the engine and battery working together;

the drive unit having a power delivery first operating zone characterized by high efficiency drive unit power delivery within a maximum drive unit power capability, the engine having a power delivery second operating zone characterized by high efficiency engine power delivery;

the engine and the drive unit having an intermediate operating region in which the drive unit operates with reduced efficiency and the engine may be started to develop driving torque; and means for anticipating an instant when the maximum power capability of the drive unit is reached during a transition between the first and second power delivery operating zones;

the powertrain control system having a vehicle brake pedal driver input including brake pedal-controlled vehicle brakes, the powertrain control system including a brake pedal driver input and responding to a rate of change of brake pedal force, the engine being started at a calculated time within the intermediate operating region relative to the instant when the maximum power capability of the drive unit is reached during a transition between the power delivery operating zones.

8. The hybrid electric vehicle set forth in claim 7 wherein the powertrain comprises a planetary gear unit and the electric drive unit comprises a generator and a motor;

the planetary gear unit having a first element drivably connected to the generator, a second element drivably connected to the vehicle traction wheels and a third element drivably connected to the engine; and the motor being drivably connected to the vehicle traction wheels.

9. The hybrid electric vehicle set forth in claim 8 wherein the power transmission comprises a planetary gear unit and the electric drive unit comprises a generator and a motor;

the planetary gear unit having a first element drivably connected to the generator, a second element drivably connected to the vehicle traction wheels and a third element drivably connected to the engine; and the motor being drivably connected to the vehicle traction wheels.

10. A hybrid electric vehicle powertrain having a vehicle brake pedal, an internal combustion engine with an accelerator pedal and a throttle controlled by a vehicle system controller that responds to accelerator pedal movement and vehicle brake pedal movement, an electric drive unit, a battery electrically connected to the drive unit for powering the electric drive unit;

a powertrain control system electrically coupled to the vehicle system controller including an engine speed and torque control, a drive unit speed and torque control and means for measuring rates of change of accelerator pedal position and vehicle brake pedal force whereby engine on and off states and drive unit on and off states are effected;

the drive unit having a power delivery first operating zone characterized by high efficiency drive unit power delivery within a maximum power capability, the engine having a power delivery second operating zone characterized by high efficiency engine power delivery;

the engine and the drive unit having an intermediate power delivery operating zone in which the drive unit operates with reduced efficiency and the engine may be started to develop driving torque; and means for anticipating an instant, during operation in the intermediate zone, when the maximum power capability of the battery is reached whereby the engine is started to effect a smooth power transition between the intermediate and second power delivery operating zones;

the powertrain control system responding to operating variables including a rate of change of accelerator pedal position whereby the engine is started at a calibrated time before the maximum power capability of the battery is reached.

11. The hybrid electric vehicle set forth in claim 10 wherein the powertrain operating variables include vehicle speed and rate of vehicle acceleration.

12. The hybrid electric vehicle set forth in claim 10 wherein the powertrain operating variables include road grade.

13. A hybrid electric vehicle powertrain having an internal combustion engine with an accelerator pedal and a throttle controlled by a vehicle system controller that responds to accelerator pedal movement and vehicle brake pedal movement, an electric drive unit, a battery electrically connected to the drive unit for powering the electric drive unit; and a powertrain control system electrically coupled to the vehicle system controller including an engine speed and torque control, a drive unit speed and torque control and means for measuring rates of change of accelerator pedal position and vehicle brake pedal force whereby engine on and off states and drive unit on and off states are effected;

the drive unit having a power delivery first operating zone characterized by high efficiency drive unit power delivery with a maximum power capability threshold, the engine having a power delivery second operating zone characterized by high efficiency engine power delivery;

the engine and the drive unit having an intermediate power delivery operating zone in which the drive unit operates with reduced efficiency and the engine may be started to develop driving torque; and the controller being configured for anticipating an instant, during operation in the intermediate zone, when the maximum power capability threshold for the drive unit is reached whereby the engine may be started to effect a smooth power transition between the intermediate and second power delivery operating zones;

the powertrain control system including a brake pedal driver input, the control system responding to operating variables including a rate of change of brake pedal force and a rate of change of accelerator pedal position, the engine being started at a calculated time before the maximum power capability threshold for the drive unit is reached with the powertrain operating in the intermediate operating zone and whereby the engine is stopped in the intermediate operating zone at a calculated time when a power capability lower threshold for the drive unit is reached following operation of the powertrain in the second operating zone.

14. The hybrid electric vehicle set forth in claim 13 wherein the power transmission comprises a planetary gear unit and the electric drive unit comprises a generator and a motor;

the planetary gear unit having a first element drivably connected to the generator, a second element drivably connected to the vehicle traction wheels and a third element drivably connected to the engine; and the motor being drivably connected to the vehicle traction wheels.

15. A hybrid electric vehicle with vehicle wheel brakes, a powertrain having a throttle-controlled internal combustion engine with an accelerator pedal and a throttle that responds to accelerator pedal driver input, an electric drive unit, and a battery electrically connected to the drive unit for powering the drive unit;

a powertrain control system adapted to respond to powertrain operating to turn off the engine to effect power delivery solely from the battery and to turn on the engine to effect power delivery selectively by the engine solely and by the engine and battery working together;

the drive unit having a power delivery first operating zone characterized by high efficiency drive unit power delivery, the engine having a power delivery second operating zone characterized by high efficiency engine power delivery;

the engine and the drive unit having an intermediate operating zone in which the drive unit operates with reduced efficiency and the engine may be started to develop driving torque; and the control system being configured for anticipating an engine start at an instant before the maximum power capability of the drive unit is reached during a transition between the intermediate and second power delivery operating zones;

the powertrain control system having a vehicle brake pedal driver input brake pedal-controlled vehicle brakes and responding to a rate of change of brake pedal force, the engine being stopped at a calculated time within the intermediate operating zone when a transition is made between the intermediate and first operating zones.

16. The hybrid electric vehicle set forth in claim 15 wherein the powertrain comprises a planetary gear unit and the electric drive unit comprises a battery, a generator and a motor;

the planetary gear unit having a first element drivably connected to the generator, a second element drivably connected to the vehicle traction wheels and a third element drivably connected to the engine;

the motor being drivably connected to the vehicle traction wheels.

17. A hybrid electric vehicle powertrain having a throttle-controlled internal combustion engine with an accelerator pedal and a throttle that responds to accelerator pedal movement, a vehicle brake pedal movement, an electric drive unit, a battery electrically connected to the drive unit for powering the electric drive unit;

a powertrain control system including an engine speed and torque control, a drive unit speed and torque control and means for measuring rates of change of accelerator pedal position and vehicle brake pedal force whereby engine on and off states and drive unit on and off states are effected;

the drive unit having a power delivery first operating zone characterized by high efficiency drive unit power delivery within a power capability upper threshold, the engine having a power delivery second operating zone characterized by high efficiency engine power delivery;

the engine and the drive unit having an intermediate power delivery operating zone with a lower power capability threshold in which the drive unit operates with reduced efficiency and the engine may be started to develop driving torque; and the control system being configured for anticipating an instant, during operation in the intermediate zone, when the power capability upper threshold for the drive unit is reached whereby the engine is started to effect a smooth power transition between the intermediate and second power delivery operating zones;

the powertrain control system including a brake pedal driver input, the control system responding to operating variables including a rate of change of brake pedal force and a rate of change of accelerator pedal position whereby the engine may be started at a calculated time before the power capability upper threshold for the drive unit is reached with the powertrain operating in the intermediate operating zone and whereby the engine is stopped in the intermediate operating zone when the power capability lower threshold for the battery is reached following operation in the second operating zone during a transition from the second operating zone.

18. The hybrid electric vehicle set forth in claim 17 wherein the powertrain comprises a planetary gear unit and the electric drive unit comprises a battery, a generator and a motor;

the planetary gear unit having a first element drivably connected to the generator, a second element drivably connected to the vehicle traction wheels and a third element drivably connected to the engine;

the motor being drivably connected to the vehicle traction wheels.

19. A hybrid electric vehicle powertrain having an internal combustion engine with an accelerator pedal and a throttle controlled by a vehicle system controller that responds to accelerator pedal movement and vehicle brake pedal movement, an electric drive unit, a battery electrically connected to the drive unit for powering the electric drive unit;

a powertrain control system electrically coupled to the vehicle system controller including an engine speed and torque control, a drive unit speed and torque control and means for measuring accelerator pedal position and vehicle brake pedal force whereby engine on and off states and drive unit on and off states are effected;

the drive unit having a power delivery first operating zone characterized by high efficiency drive unit power delivery below a maximum power capability threshold for the first operating zone, the engine having a power delivery second operating zone characterized by high efficiency engine power delivery;

the engine and the drive unit having a power delivery operating zone in which the drive unit operates with reduced efficiency and the engine may be started to develop driving torque; and the controller being configured for anticipating an instant, during operation in the intermediate zone, when the maximum power capability threshold of the drive unit is reached whereby the engine is started to effect a smooth power transition between the intermediate and second power delivery operating zones;

the powertrain control system responding to operating variables including accelerator pedal position and brake pedal force whereby the engine may be started at a calculated time before the maximum power capability threshold for the drive unit is reached.

* * * * *